United States Patent
Kobayashi

(10) Patent No.: US 10,891,750 B2
(45) Date of Patent: Jan. 12, 2021

(54) PROJECTION CONTROL DEVICE, MARKER DETECTION METHOD, AND STORAGE MEDIUM

(71) Applicant: CASIO COMPUTER CO., LTD., Tokyo (JP)

(72) Inventor: Masaki Kobayashi, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 59 days.

(21) Appl. No.: 16/283,803

(22) Filed: Feb. 24, 2019

(65) Prior Publication Data

US 2019/0295277 A1 Sep. 26, 2019

(30) Foreign Application Priority Data

Mar. 26, 2018 (JP) .................. 2018-057994

(51) Int. Cl.
*G06T 7/564* (2017.01)
*G03B 21/56* (2006.01)
*G03B 21/14* (2006.01)

(52) U.S. Cl.
CPC ........... *G06T 7/564* (2017.01); *G03B 21/145* (2013.01); *G03B 21/567* (2013.01); *G06T 2207/30204* (2013.01)

(58) Field of Classification Search
CPC .......... G06T 7/564; G06T 2207/30204; G03B 21/567; G03B 21/145
USPC ...................................................... 382/154
See application file for complete search history.

(56) References Cited

U.S. PATENT DOCUMENTS

| 8,003,927 B2 | 8/2011 | Kondo et al. |
| 8,870,386 B2 | 10/2014 | Kasuya et al. |
| 2004/0128102 A1* | 7/2004 | Petty ................ G01S 5/163 702/150 |
| 2008/0266253 A1* | 10/2008 | Seeman ............ G06F 3/0346 345/158 |
| 2008/0267531 A1* | 10/2008 | Satoh ............... G06K 9/3216 382/289 |
| 2008/0285854 A1* | 11/2008 | Kotake ................ G06T 7/73 382/190 |
| 2012/0127323 A1* | 5/2012 | Kasuya .............. H04N 9/3185 348/189 |
| 2014/0225915 A1* | 8/2014 | Theimer ............ G02B 27/017 345/633 |

(Continued)

FOREIGN PATENT DOCUMENTS

| JP | 2007194784 A | 8/2007 |
| JP | 2011081775 A | 4/2011 |
| WO | 2007072695 A1 | 6/2007 |

OTHER PUBLICATIONS

Japanese Office Action (and English language translation thereof) dated Jul. 16, 2020 issued in counterpart Japanese Application No. 2018-057994.

*Primary Examiner* — Congvan Tran
(74) *Attorney, Agent, or Firm* — Holtz, Holtz & Volek PC

(57) ABSTRACT

A projection control device according to the invention includes a projection module configured to project a correcting image in which a marker including a first polygon and a second polygon disposed inside the first polygon is provided in a predetermined position in such a manner as to be picked up by an image pickup device, and at least one of sides of the first polygon is not parallel to sides of the second polygon.

13 Claims, 7 Drawing Sheets

(56) References Cited

U.S. PATENT DOCUMENTS

| | | | |
|---|---|---|---|
| 2014/0267031 A1* | 9/2014 | Huebner | G06F 3/0346 345/158 |
| 2015/0260505 A1* | 9/2015 | Nagano | G06T 7/73 348/135 |
| 2015/0346825 A1* | 12/2015 | Chiu | G06F 3/0317 345/158 |
| 2017/0221226 A1* | 8/2017 | Shen | G06T 7/80 |
| 2017/0359573 A1* | 12/2017 | Kim | H04N 5/2256 |
| 2018/0063491 A1* | 3/2018 | Nakamura | H04N 9/3105 |

* cited by examiner

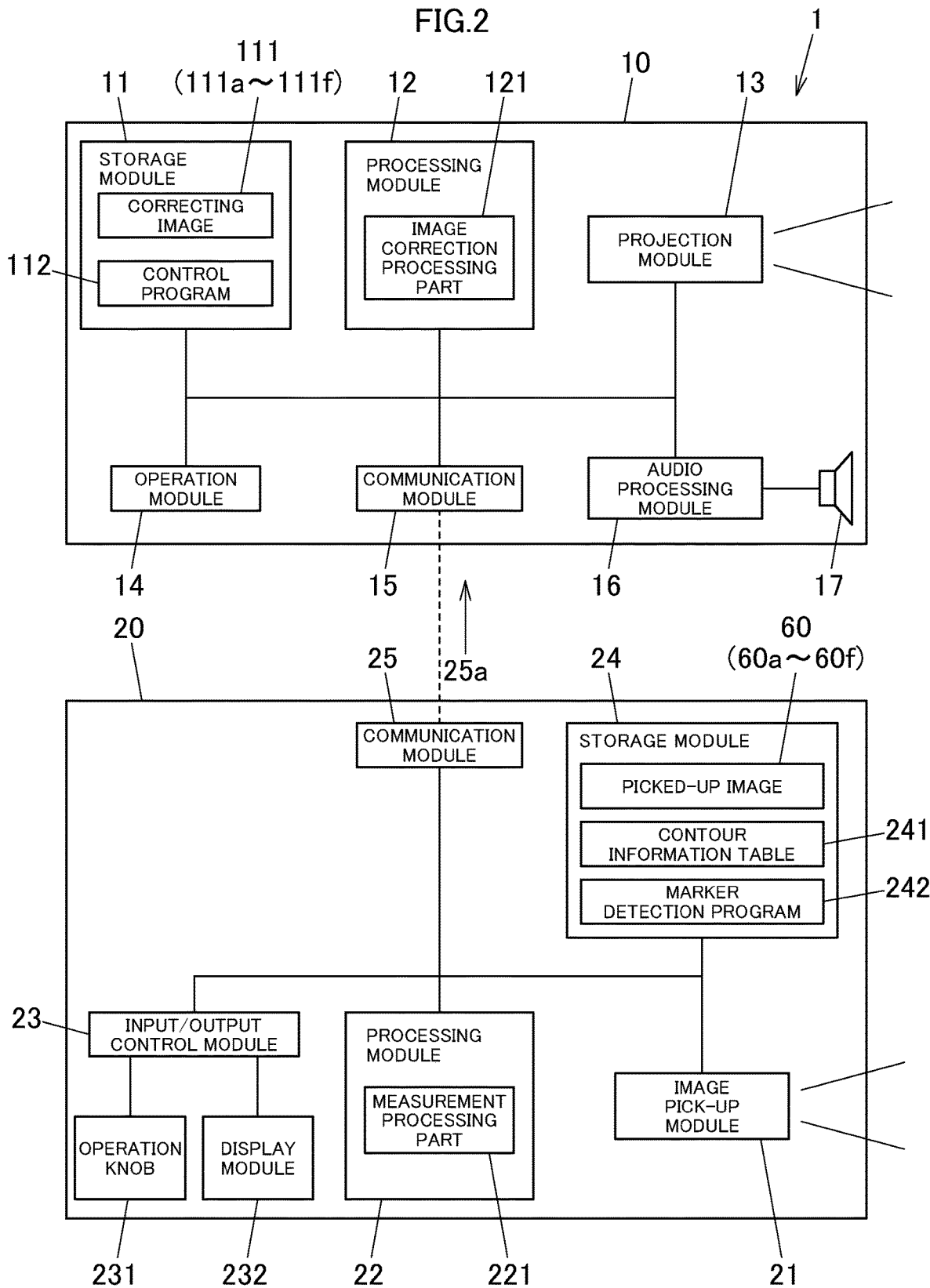

PROJECTION CONTROL DEVICE, MARKER DETECTION METHOD, AND STORAGE MEDIUM

CROSS-REFERENCE TO RELATED APPLICATION

This application is based upon and claims the benefit of priority under 35 USC 119 from Japanese Patent Application No. 2018-057994 filed on Mar. 26, 2018, the entire disclosure of which, including the description, claims, drawings and abstract, is incorporated herein by reference.

BACKGROUND OF THE INVENTION

Field of the Invention

The present invention relates to a projection control device, a mark detection method, and a storage medium.

Description of the Related Art

International Publication No. 2007/072695 proposes a technique used in a projector for projecting an image for displaying an image projected by the projector in a proper color and shape in the case where a projection plane such as a wall has a color, a pattern or a distortion.

To correct the projected image by accurately grasping the color reproducibility in a projection range of the projector, it is necessary to have a means for acquiring information on the color of the image projected on to the projection plane by the projector, including the technique described in International Publication No. 2007/072695. In this case, when the position of the projector differs from the position of a viewer of the projected image, even though an image pickup device having an image pickup module picks up an image of the project image, although depending upon situations, it becomes difficult to correct the image by taking the position of the viewer into consideration.

Then, a separate image pickup device such as a digital camera used by the user of the projector is considered as a device for accurately acquiring information on the color of an image. In the event that the color of an image projected by the projector can be corrected by picking up the image of the projected image by such a general-purpose digital camera, a simple and accurate initial setting of the projector can be realized.

However, to correct the image more accurately, it is necessary for the projector to continuously project a plurality of correcting image patterns, causing the digital camera to pick up images of the plurality of correcting image patterns. When these projected images are picked up by the digital camera held by the user, the image pickup position of the digital camera is not stabilized, resulting in fears that the picked up images are blurred due to the camera shake.

SUMMARY OF THE INVENTION

The invention has been made in view of the situations described above, and an object of the invention is to provide a projection control device facilitating the positional alignment of a plurality of correcting images, a marker detection method, and a storage medium.

According to an aspect of the invention, there is provided a projection control device including a projection module configured to project a correcting image having an image position identifying marker including a first polygon and a second polygon positioned inside the first polygon and arranged in a predetermined position, the correcting image being projected to be picked up by an image pickup device, wherein at least one of sides of the first polygon is non-parallel to sides of the second polygon.

According to another aspect of the invention, there is provided a marker detection method including projecting a correcting image having an image position identifying marker including a first polygon and a second polygon positioned inside the first polygon and arranged in a predetermined position using a projection control device, picking up a plurality of the correcting images using an image pickup device, and causing the marker to be detected, wherein at least one of sides of the first polygon is non-parallel to sides of the second polygon.

According to a further aspect of the invention, there is provided a storage medium readable by a computer, the storage medium causing the computer to function as a device configured to project a correcting image having an image position identifying marker including a first polygon and a second polygon positioned inside the first polygon and arranged in a predetermined position, a device configured to pick up a plurality of the correcting images, and a device configured to cause the marker to be detected, wherein at least one of sides of the first polygon is non-parallel to sides of the second polygon.

BRIEF DESCRIPTION OF DRAWINGS

FIG. 2 is a block diagram illustrating the configuration of the projection system according to the embodiment of the invention;

DETAILED DESCRIPTION OF THE PREFERRED EMBODIMENT

Figure 1:
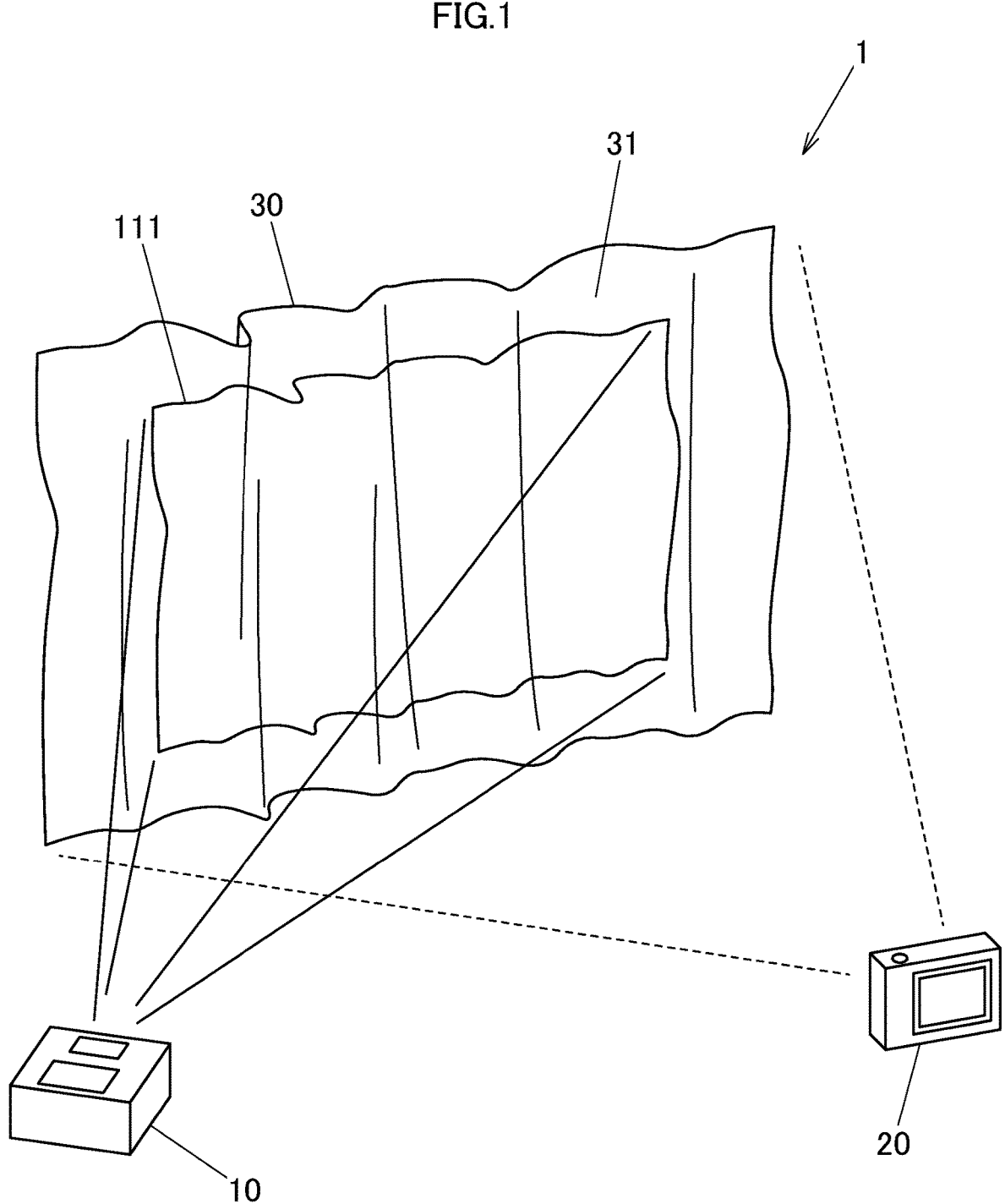
FIG. 1 is a drawing illustrating a schematic layout of a projection system according to an embodiment of the invention.

Hereinafter, an embodiment of the invention will be described. FIG. 1 is a drawing illustrating a schematic layout of a projection system 1. The projection system 1 has a projector 10 (a projection control device) configured to project an image on a projection plane 31 of a projection target object 30 such as a curtain or a wall and an image pickup device 20 such as a digital camera or a mobile phone with a camera configured to pick up an image projected on the projection plane 31. The image pickup device 20 should be any mobile digital appliance with an image input function and may be a video camera, a smartphone (a highly functional mobile phone), a tablet terminal, or the like. In this embodiment, a curtain is illustrated as the projection target object 30. The projection target 30 is hung on a rail, not shown, and has a surface that undulates mainly along a lateral direction. The projection plane 31 is colored and has patterns.

The projector 10 is located in a different position from the image pickup device 20. In FIG. 1, the projector 10 is located obliquely to the left of the projection plane 31 and projects an image on to the projection plane 31 from an oblique direction. The image pickup device 20 is located substantially in front of the projection plane 31, that is, in a position taken by a viewer who views the image projected on the projection plane 31. Consequently, an angle of view of the image picked up by the image pickup device 20 can substantially coincide with an angle of view of the image viewed by the viewer. The image pickup device 20 may be held by the user.

An operation of the projection system 1 will briefly be described. A projected image projected by the projector 10 is observed in different color and shape from those of original image data from the viewpoint of the viewer in such a state that the projected image remains as it is due to effects of the shape of the projection plane 31 or the patterns formed on the projection plane 31 or effects of a difference between the projecting direction of the projector 10 and the viewing direction of the viewer. Then, in this embodiment, a processing module 12 corrects image data so that the viewer can view preferably a projected image from the viewpoint of the viewer. When the projector 10 projects a correcting image 111, which will be described later, on the projection plane 31, the image pickup device 20 picks up the projected correcting image 111. The image pickup device 20 obtains image correction information based on a deviation between the correcting image 111 projected by the projector 10 and the correcting image 111 in a picked-up image 60 picked up by the image pickup device 20 and transmits the obtained deviation to the projector 10 by way of a wire or wirelessly. As a result of these processes, the projector 10 can project an image based on the image correction information so that original image data can be viewed in an intended form by the viewer who is an observer.

FIG. 2 is a block diagram illustrating the configuration of the projection system. The projector 10 includes a storage module 11, the processing module 12, a projection module 13, an operation module 14, a communication module 15, and an audio processing module 16, and these constituent modules are connected to one another by internal buses. The storage module is made up, for example, of a solid state driver (SSD) or a static random access memory (SRAM). The storage module 11 stores viewing image data, not shown, correcting images 111 used to correct the image data, a control program 112 of the projector 10, and the like.

The processing module 12 reads out the control program 112 stored in the storage module 11 and supervises and controls the projector 10. The processing module 12 includes an image correction processing part 121. The image correction processing part 121 acquires a correcting image 111 from the storage module 11 and transmits the acquired correcting image 111 to the image pickup module 13. Additionally, the image correction processing part 121 corrects viewing image data stored in the storage module 11 based on image correction information 25a received from the image pickup device 20 and transmits a corrected converted image to the projection module 13.

The projection module 13 projects the data of the correcting image 111 or the viewing image data transmitted from the processing module 12 including the image correction processing part 121 at a frame rate complied with a preset image format. The projection module 13 forms an image by emitting light of a different color for each pixel within one frame. The color of each pixel can be represented by emitting light of a plurality of different wavelength ranges in a time-dividing fashion. In the projector 10 of this embodiment, the projection module 13 is configured as a projection module of a digital light processing (DPL (the registered trademark)) projector; however, other systems such as a liquid crystal projector may be used. An image transmitted from the projection module 13 is projected on to the projection plane 31 illustrated in FIG. 1.

The operation module 14 receives operation signals from operation keys or the like provided on a casing of the projector 10 and transmits the operation signal to the processing module 12 by way of the bus. The processing module 12 executes various functions such as a projection process according to the operation signals from the operation module 14.

The communication module 15 receives operation signals of infrared modulation signals from a remote controller, not shown, and transmits the operation signals to the processing module 12. Additionally, the communication module 15 can communicate with a communication module 25 of the image pickup device 20. The communication module 15 can include an external input terminal, so that viewing image data can be inputted thereinto from an external device. The communication module 15 of the projector 10 can communicate with the communication module 25 of the image pickup device 20 by way of a wire or wirelessly.

The audio processing module 16 includes a sound source circuit such as a PCM sound source and emits sound loudly by driving a speaker 17. When an audio signal is included in image data to be projected, the audio processing module 16 converts the audio signal into an analog signal and outputs the analog converted audio signal by way of the speaker 17 when the image data is projected.

The image pickup device 20 includes an image pickup module 21, a processing module 22, an input/output control module 23, a storage module 24, and the communication module 25, and these modules are connected to one another by way of internal buses. The image pickup module 21 picks up an image projected on to the projection plane 31 illustrated in FIG. 1.

The processing module 22 has a function to control the image pickup device 20. The processing module 22 includes a measurement processing part 221. The measurement processing part 221 analyzes a picked-up image 60 including a collecting image 11 picked up by the image pickup module 21. The measurement processing part 221 transmits the results of analyzing the correcting image 111 to the projector 10 by way of the communication module 25 as image correction information 25a.

The input/output control module 23 receives an operational instruction inputted from an operation knob 231 by the user and transmits the received operational instruction to the processing module 22. A display module 232 is a screen or a display lamp configured to display an image outputted from the input/output control module 23.

The storage module 24 stores a contour information table 241 and a control program of the image pickup device 20. The control program includes a marker detection program 242. Additionally, the storage module 24 stores the picked-up image 60 picked up by the image pickup module 21.

Next, referring to FIGS. 3A to 3F, the correcting image 111, which is to be stored in the storage module 11 of the projector 10, will be described. The correcting image 11 has correcting images 111a to 111f. The correcting images 111a to 111f can be rectangular images of an aspect ratio corresponding to a projection mode, and in FIG. 3, the correcting images 111a to 111f are each made into a rectangular shape elongated laterally as a whole. The correcting images 111a to 111f individually have image position identifying markers 41 disposed in four corners of the whole of the image, and the other remaining area than the markers 41 is referred to as a measurement area 42.

Figure 3A:
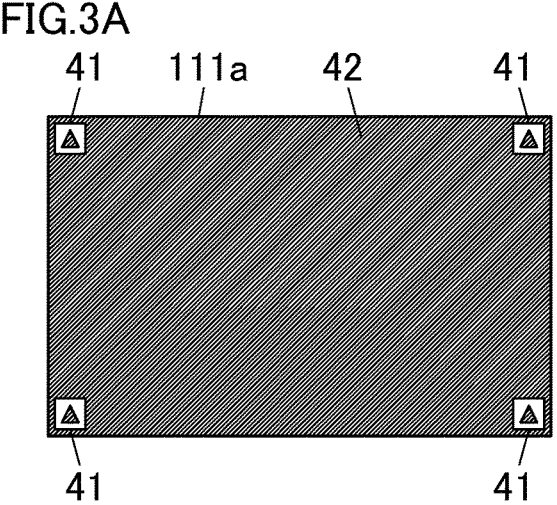
FIG. 3A is a drawing illustrating a correcting image according to the embodiment of the invention, the correcting image being a correcting image for correcting a color of a measurement target object.
Figure 3B:
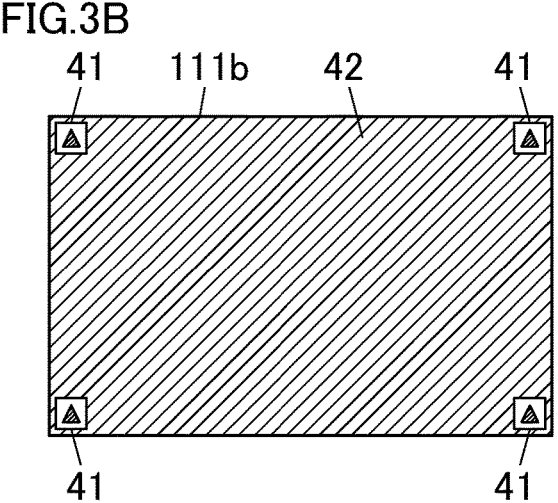
FIG. 3B is a drawing illustrating a correcting image according to the embodiment of the invention, the correcting image being a correcting image for correcting the color of the measurement target object.
Figure 3C:
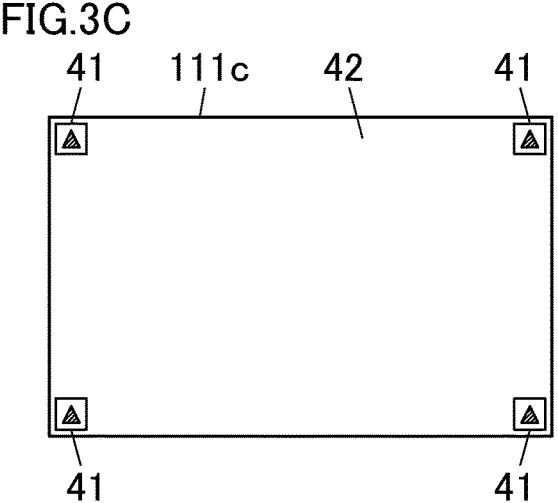
FIG. 3C is a drawing illustrating a correcting image according to the embodiment of the invention, the correcting image being a correcting image for correcting the color of the measurement target object.
Figure 3D:
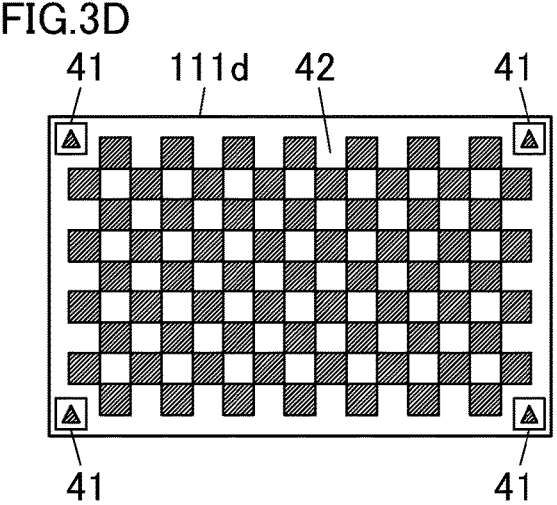
FIG. 3D is a drawing illustrating a correcting image according to the embodiment of the invention, the correcting image being a correcting image for correcting a distortion of the measurement target object.
Figure 3E:
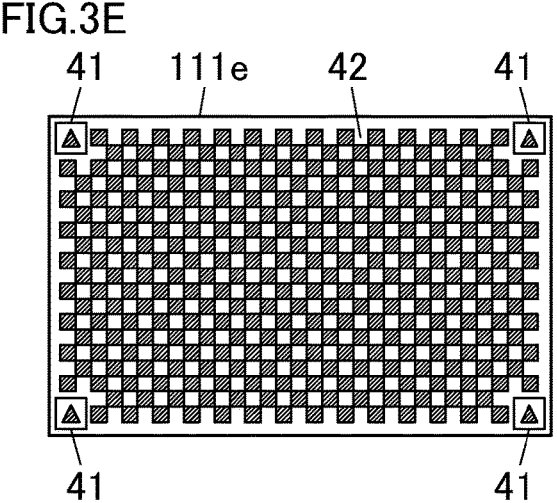
FIG. 3E is a drawing illustrating a correcting image according to the embodiment of the invention, the correcting image being a correcting image for correcting the distortion of a measurement target object.
Figure 3F:
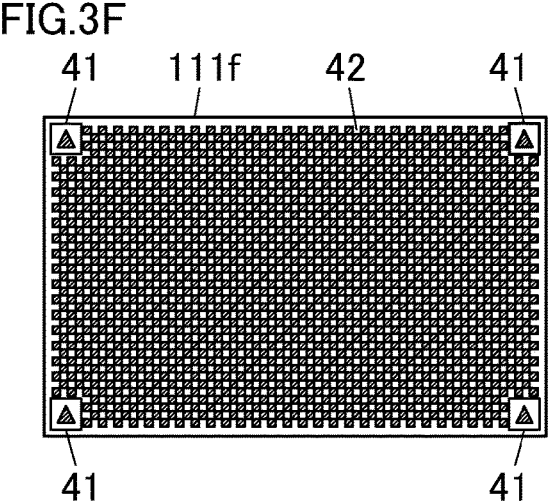
FIG. 3F is a drawing illustrating a correcting image according to the embodiment of the invention, the correcting image being a correcting image for correcting the distortion of the measurement target object.
Figure 4:
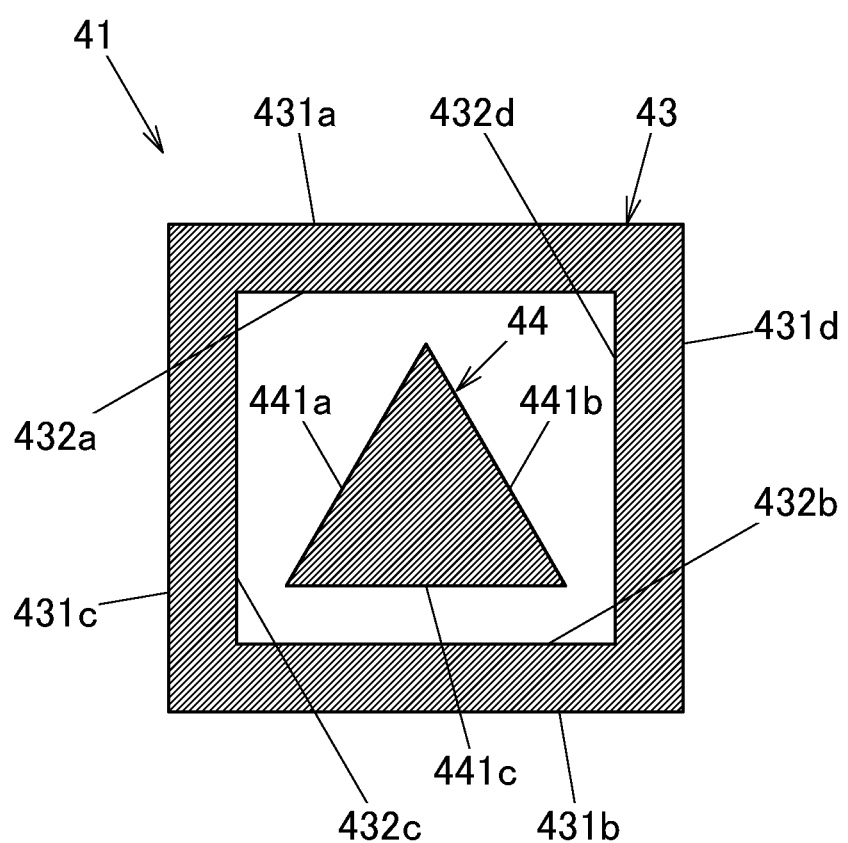
FIG. 4 is a drawing illustrating the configuration of a marker according to the embodiment of the invention.

FIG. 4 is a drawing illustrating the configuration of the markers 41 provided on the individual correcting images 111a to 111f. The marker 41 is made up of a first polygon 43 and a second polygon 44 that is disposed inside the first polygon 43. The first polygon 43 is formed into a regular quadrangle having opposite parallel and equilateral sides and an internal angle of 90 degrees. The individual sides of the first polygon 43 are given a predetermined width and are colored black by outer edge sides 431a to 431d and inner edge sides 432a to 432d, and an inside of the first polygon 43 that is surrounded by the edge sides 432a to 432d are colored white. An outside of the first polygon 43 that is divided by the outer edge sides 431a to 431d is colored in a color corresponding to that of the measurement area 42 (refer to FIGS. 3A to 3F) of the correcting image 111. The second polygon 44 is formed in the area surrounded by the inner edge sides 432a to 432d of the first polygon 43. The second polygon 44 is formed into a regular triangle having equilateral edge sides 441a to 441c. An inside of the second polygon 44 that is surrounded by the edge sides 441a to 441c is colored black that is similar color to that of the first polygon. In this embodiment, the markers 41 are identified by causing the image pickup device 20 to detect the edge sides 432a to 432d of the first polygon and the edge sides 441a to 441c of the second polygon 44.

The upper and lower edge sides 431a, 431b, 432a, 432b are disposed parallel to the lower edge side 441c of the second polygon 44. The edge sides 431a to 431d, 432a to 432d are formed to be non-parallel to the left and right edge sides 441a, 441b of the second polygon 44. In this way, the marker 41 is formed so that while the first polygon 43 and the second polygon 44 have the different numbers of vertexes, at least one of the sides of the first polygon 43 is non-parallel to the sides of the second polygon and that another side of the first polygon 43 that is different from the one side is parallel to any one of the sides of the second polygon 44.

FIGS. 3A to 3C are the correcting images 111a to 111c for correcting the color of the projection plane 31. The correcting image, 111a, the correcting image 111b, and the correcting image 111c have measurement areas 42 whose overall surfaces are substantially colored black, grey and white, respectively. The projector 10 projects the image correcting images 111a to 111c on the projection plane 31 and causes the image pickup device 20 to pick up the image correcting images 111a to 111c to detect a change in color attributed to the patterns formed on the projection plane 31 or a distortion of the projection plate 31.

FIGS. 3D to 3F are the correcting images 111d to 111f for correcting the distortion of an image projected on the projection target object 30. The correcting image 111d, the correcting image 111e and the correcting image 111f each have a checkered pattern in which white quadrangles of a substantially square shape and black quadrangles of a substantially square shape are arranged alternately in vertical and horizontal directions on a substantially overall surface of the measurement area 42. The correcting images 111d to 111f have different resolutions resulting from the checkered patterns of different sizes and can detect a distortion of the projection plane 31 with the resolutions. The projector 10 projects the correcting images 111d to 111f on the projection plane 31 and causes the image pickup device 20 to pick up the correcting images 111d to 111f. The image pickup device 20 can detect an overall distortion of the projecting plate 31 by combining the plurality of correcting images 111d to 111f.

Figure 5:
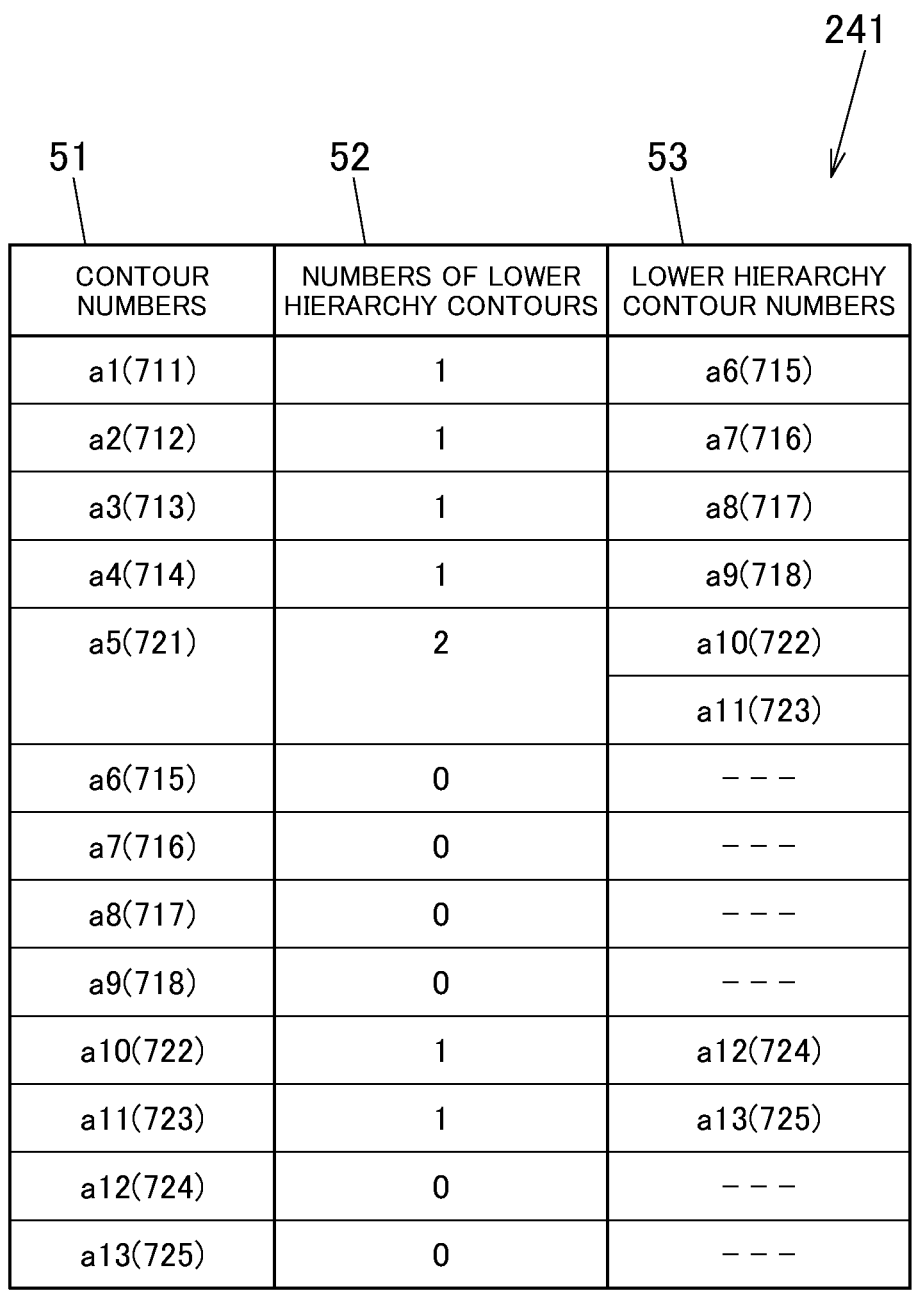
FIG. 5 is a chart illustrating the configuration of a contour information table according to the embodiment of the invention.

FIG. 5 is a chart illustrating the configuration of the contour information table 241. The contour information table 241 stores contour numbers 51, the numbers of lower hierarchy contours 52 and lower hierarchy contour numbers 53 and correlates them with one another. An acquisition method of acquiring each data will be described later while referring to a flow chart illustrated in FIG. 6. The contour numbers 51 are identification numbers set for contours extracted in a contour extraction process (step S20 in FIG. 6). The number of lower hierarchy numbers 52 denotes, when a contour corresponding to a contour number 51 constitutes a closed area, the number of contours included in a layer residing one layer more inwards than the contour corresponding to the contour number 51. The lower hierarchy contour numbers 53 are identification numbers set for contours counted in the number of lower hierarchy contours 52. In this way, the contour information table 241 can store the hierarchy configuration of each contour.

Next, a marker detection method using the correcting images 111a to 111f will be described. Firstly, the image correction processing part 121 of the projector 10 illustrated in FIG. 2 acquires the correcting images 111 (111a to 111f) stored in the storage module 11. The image correction processing part 121 transmits sequentially the acquired correcting images 111 in a predetermined order to the projection module 13. The projection module 13 projects the received correcting images 111 on to the projection plane 31. In this embodiment, the projector 10 projects sequentially the black correcting image 111a, the grey correcting image 111b, the white correcting image 111c, the large-sized checkered pattern correcting image 111d, the middle-sized checkered pattern correcting image 111e, and the small-sized checkered pattern correcting image 111f. As this occurs, quadrangular corner portions of the individual correcting images 111d, 111e, 111f of the checkered patterns of the different sizes are located in positions where they are not superposed on one another when projected on to the projection plane 31.

The image pickup device 20 picks up the plurality of correcting images 111a to 111f projected on to the projection plane 31 in a time-dividing fashion. As this occurs, the image pickup device 20 picks up an image of a wider range than the correcting image 111 projected as illustrated in FIG. 1 to thereby acquire a picked-up image 60a illustrated in FIG. 7A. The picked-up image 60a is an image resulting when the correcting image 111a is picked up and includes the correcting image 111a and an external area 60a1 around the periphery of the correcting image 111a. In the case of the picked-up image 60a, since the peripheral environment is made relatively dark, the external area 60a1 is acquired as a black area that is substantially as black as the measurement area 42. A pattern 31a formed on the projection plane 31 is picked up together with the markers 41 within an area indicated by chain double-dashed lines. Picked-up images 60a to 60f corresponding to the picked up individual correcting images 111a to 111f are stored in the storage module 24. In this embodiment, the positions of the markers 41 within the individual picked-up images 60a to 60f are detected to detect positional deviations of the plurality of correcting images 111a to 111f that are projected and picked up in the time-dividing fashion, whereby an offset correction is executed. In the correcting images 111a to 111f illustrated in FIGS. 3A to 3F, respectively, since the markers 41 are disposed in the same positions in the four corners of the individual correcting images, the measurement processing part 221 detects positional deviations of the markers 41 among the correcting images 111a to 111f to thereby detect a positional deviation of a translating component and a rotational component of the correcting images 111a to 111f. Next, a detecting process of the markers 41 will be described.

Figure 6:
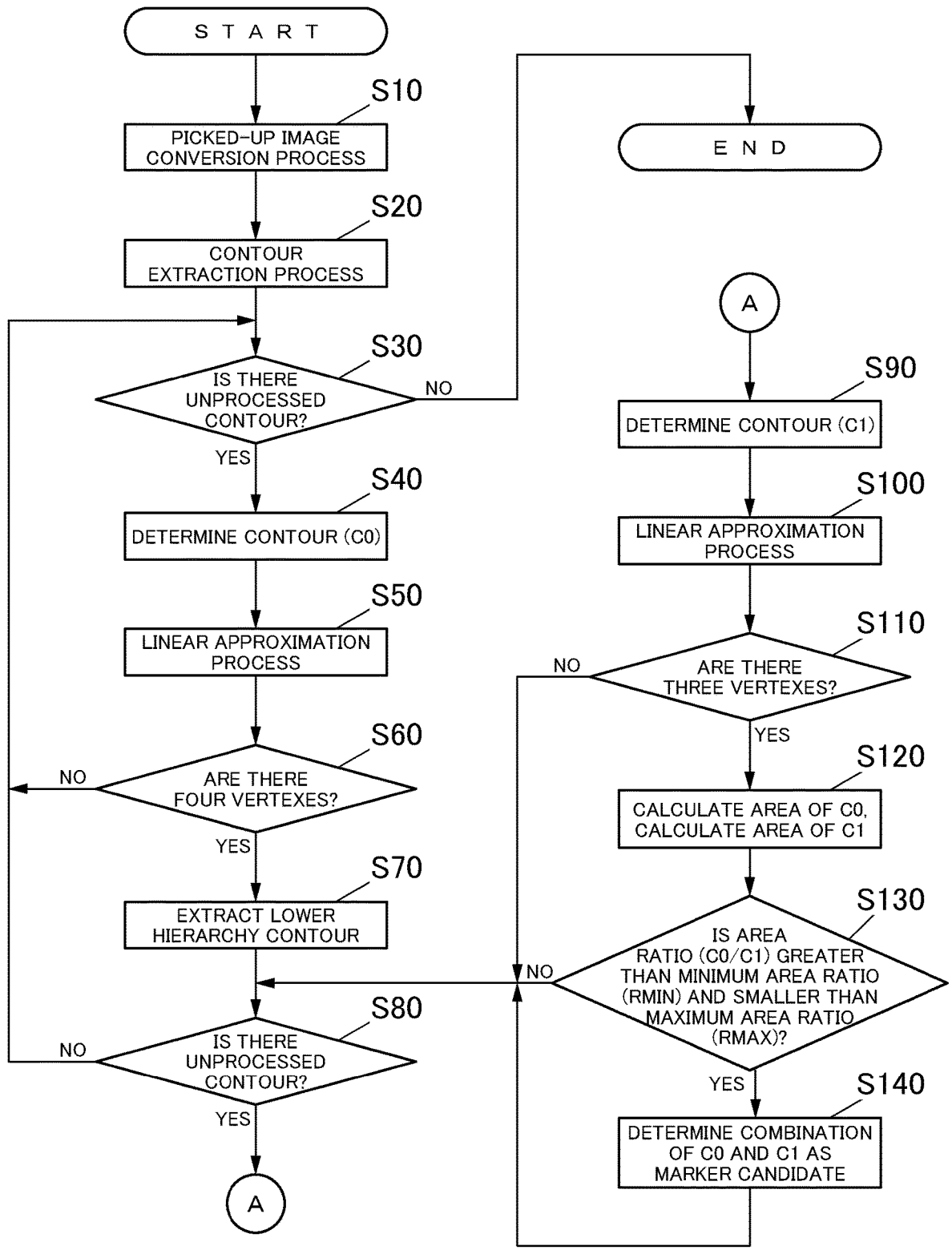
FIG. 6 is a flow chart of a marker detection program according to the embodiment of the invention.
Figure 7A:
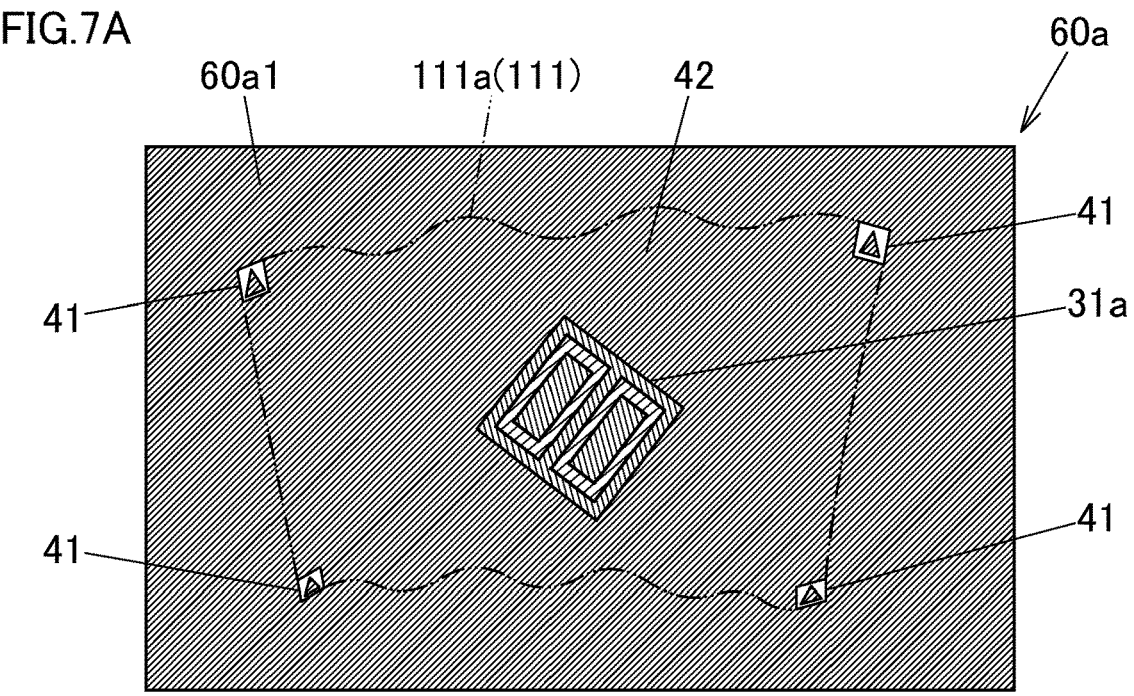
FIG. 7A illustrates an image to be processed by an image pickup device according to the embodiment of the invention, the image being a first correcting image picked up by the image pickup device.

FIG. 6 is a flow chart of a maker detection program executed by the measurement processing part 221 (the processing module 22). Although this flow chart describes an example in which the picked-up image 60a illustrated in FIG. 7A is processed, the same will be applied to picked-up images 60b to 60f that result from picking up the correcting images 111b to 111f. Firstly, the measurement processing part 221 reads in the picked-up image 60a stored in the storage module 24. In step S10, the measurement processing part 221 executes a picked-up image conversion process of binarizing the picked-up image 60a using an appropriate method.

Figure 7B:
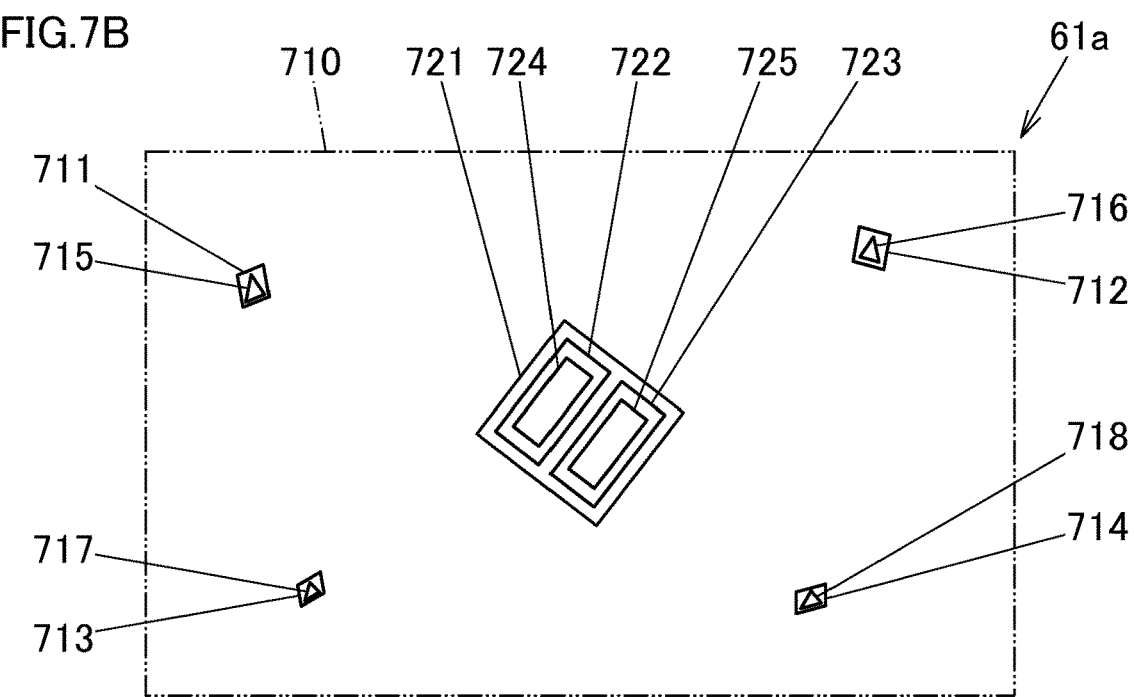
FIG. 7B illustrates an image to be processed by the image pickup device according to the embodiment of the invention, the image being an image resulting after a contour extraction is executed on the first correcting image.

In step S20, the measurement processing part 221 executes a contour extraction process having hierarchy level information from the binary image converted in step S10. The contour extraction process can be executed using the findContours function of OpenCV library. Specifically, the measurement processing part 221 detects a boundary between a black pixel and a white pixel of the binary image as a contour. FIG. 7B illustrates a contour extracted image 61a resulting from visualizing the results of the contour extraction process. In the example illustrated in this figure, eight contours 711 to 718 are extracted as corresponding to the markers 41, and five contours 721 to 725 are extracted as corresponding to the pattern 31a. The measurement processing part 221 sets sequentially contour numbers for the detected contours as identification information, for example, from an outside of the contour extracted image 61a. In this figure, contour numbers a1 to a4 are sequentially set for the contours 711 to 714, respectively, which reside within an image pickup range 710. Contour numbers a6 to a9 are also sequentially set for the contours 715 to 718, respectively, which are extracted inside the contours 711 to 714. Additionally, a contour number a5 is set for the contour 721, and contour numbers a10 to a13 are set for the contours 722 to 725, respectively.

The measurement processing part 221 stores the numbers of lower hierarchy contours and the lower hierarchy contour numbers of the individual contours 711 to 178, 721 to 725, which constitute the hierarchy information thereof, in association with each other as the numbers of lower hierarchy contours 52 and the lower hierarchy contour numbers 53 of the contour information table 241. By doing so, when one contour is nested in an area closed by another contour, the positional relationship between the two contours, that is, which contour of the two contours resides inside or outside the other can be grasped.

In step S30, the measurement processing part 221 determines whether there remains an unprocessed contour on which the marker detection process has not yet been executed. If the measurement processing part 221 determines that there remains an unprocessed contour (S30, YES), the measurement processing part 221 proceeds to a process in step S40, whereas if the measurement processing part 221 determines that there remains no unprocessed contour (S30, NO), the measurement processing part 221 ends the marker detection program. In an initial state, the contours 711 to 718, 721 to 725 are not processed (S30, YES), and therefore, the measurement processing part 221 proceeds to the process in step S40.

In step S40, the measurement processing part 221 determines a process target contour C0 (a first process target). The measurement processing part 221 determines, for example, the contour whose contour number constitutes a smallest numerical value in the contour numbers 51 of the contour information table 241 as the process target contour C0. In the example of the contour extracted image 61a, when in an initial state, the measurement processing part 221 extracts as the process target contour C0 the contour 711 whose contour number 51 is "a1" which constitutes the smallest number in the contour numbers 51.

Figure 7C:
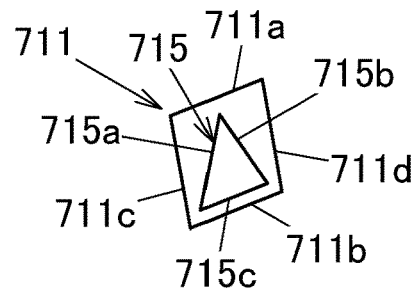
FIG. 7C illustrates an image to be processed by the image pickup device according to the embodiment of the invention, the image being an enlarged view of a contour of an extracted marker portion.

In step S50, the measurement processing part 221 executes a linear approximation process where a closed area can be set. The linear approximation process can be executed using, for example, the approxPolyDP function of OpenCV library. FIG. 7C is an enlarged view of the contour 711 and the contour 715 which are extracted in steps S10 to S40. When the process target contour C0 is the contour 711, the contour 711 is linearly approximated to a quadrangular shape which is closed by four lines 711a to 711d.

In step S60, the measurement processing part 221 determines whether the contour C0 is a line whose number of vertexes is "4" and which is closed (a first condition). If the measurement processing part 221 determines that the number of vertexes of the contour C0 is "4" (S60, YES), the measurement processing part 221 proceeds to a process in step S70, whereas if the measurement processing part 221 does not determine that the number of vertexes of the contour C0 is "4" (S60, NO), the measurement processing part 221 returns to the process in step S30. Since the number of vertexes becomes "4" when the process target contour C0 is the contour 711 (S60, YES), the marker detection process proceeds to step S70.

In step S70, the measurement processing part 221 extracts a lower hierarchy contour which resides one more inwards than the process target contour C0. For example, in the case where the process target contour C0 is the contour 711, the measurement processing part 221 refers to the contour information table 241 illustrated in FIG. 5 to determine whether the number of lower hierarchy contours 52 corresponding to the contour number 51 of "a1" is "1" or greater. If the measurement processing part 221 determines that the number of lower hierarchy contours 52 is "1" or greater, the contour 715 whose lower hierarchy contour number 53 is "a6" which corresponds to the contour number 51 of "a1" is extracted. As in the case with a contour number 53 of "a5" having a plurality of lower hierarchy contour numbers 53 stored in the contour information table 241, the plurality of lower hierarchy contour numbers are extracted. On the contrary, when the number of lower hierarchy contours 52 is "0", no lower hierarchy contour is extracted.

In step S80, the measurement processing part 221 determines whether there is an unprocessed contour inside the contour extracted in step S70. If the measurement processing part 221 determines that there is an unprocessed contour (S80, YES), the measurement processing part 221 proceeds to a process in step S90, whereas if the measurement processing part 221 does not determined that there is an unprocessed contour (S80, NO), the measurement processing part 221 returns to the process in step S30.

In step S90, the measurement processing part 221 determines a process target contour C1 (a second process target) from unprocessed contours in the contours extracted as residing in the contour C0 in step S70. A contour whose contour number is the smallest can be selected from the unprocessed contours as the process target contour C1. For example, when the contour 715 whose lower hierarchy contour number 53 is "a6" is extracted as residing inside the contour 711 in step S70 and the contour 715 remains unprocessed, the contour 715 is determined to be the process target contour C1.

In step S100, the measurement processing part 221 executes a linear approximation process where a closed area can be set on the contour C1 determined as the process target contour in step S90. As in step S50, the linear approximation process can be executed using the approxPolyDP function of OpenCV library. When the process target contour C1 is the contour 715, the process target contour C1 is linearly approximated to a triangular shape which is closed by three lines 715a to 715c illustrated in FIG. 7C.

In step S110, the measurement processing part 221 determines whether the contour C1 is a line whose number of vertexes is "3" and which is closed (a second condition). If the measurement processing part 221 determines that the number of vertexes of the contour C1 is "3" (S110, YES), the measurement processing part 221 proceeds to a process in step S120, whereas if the measurement processing part 221 does not determine that the number of vertexes of the contour C1 is "3" (S110, NO), the measurement processing part 221 returns to the process in step S80. Since the number of vertexes of the contour C1 is "3" when the process target contour C1 is the contour 715 (S110, YES), the marker detection process proceeds to a process in step S120.

In step S120, the measurement processing part 221 calculates an area of the contour C0 and an area of the contour C1. In the example where the contour C0 is the contour 711 and the contour C1 is the contour 715, in step S120, an area S0 of the contour 711 (the contour C0) whose number of vertexes is "4" and an area S1 of the contour (the contour C1) whose number of vertexes is "3" are calculated.

In step S130, the measurement processing part 221 determines whether a value resulting from dividing the area S0 by the area S1 (a ratio of the area S0 to the area S1) is greater than a predetermined minimum area ratio Rmin and is smaller than a maximum area ration Rmax. If the measurement processing part 221 determines that the value resulting from dividing the area S0 by the area S1 is greater than the minimum area ratio Rmin and is smaller than the maximum area ratio Rmax (S130, YES), the measurement processing part 221 proceeds to a process in step S140. On the other hand, if the measurement processing part 221 determines that the value resulting from dividing the area S0 by the area S1 is the minimum area ratio Rmin or smaller or is the maximum area ratio Rmax or greater (S130, NO), the measurement processing part 221 returns to the process in step S80. A range of the minimum area ratio Rmin and a range of the maximum area ratio Rmax can be determined based on an area of the quadrangle and an area of the triangle when they are designed by taking the image pickup capability and the measuring tolerance of the image pickup device 20 into consideration.

In step S140, the measurement processing part 221 extracts a combination of the contour C0 and the contour C1 which are now selected as a marker candidate and stores the combination in the storage module 24.

When the process target contour C0 is the contour 721 (whose contour number is "a5") which has nothing to do with the markers 41 illustrated in FIG. 7B in steps S40 to S60, since the number of vertexes of the contour 721 is "4", the marker determination process proceeds to step S70. In steps S70 to S90, the contour 722 corresponding to a contour number "a10" or the contour 723 corresponding to a contour number "a11" is extracted from a lower hierarchy number 53 corresponding to a contour number 51 of "a5" as the contour C1. However, since the number of vertexes of either of the contours 722 and the contour 723 is not "3" (S110, NO), a combination of the contour 721 and the contour 722 or the contour 723 is excluded from marker candidates.

Similarly, even though the process target contour C0 in steps S40 to S60 is the contour 722 or the contour 723, since the numbers of vertexes of the contour 724 and the contour 725 which are disposed inside those contours 722 and 723 are not "3" (S110, NO), a combination of the contour 722 and the contour 724 and a combination of the contour 723 and the contour 725 are excluded from marker candidates.

By going through steps S30 to S140, a combination of the contour 711 and the contour 715, a combination of the contour 712 and the contour 716, a combination of the contour 713 and the contour 717, and a combination of the contour 714 and the contour 718 are selected as marker candidates from the contour extracted image 61a. The measurement processing part 221 can determine the extracted four marker candidates as the markers 41 projected by the projector 10.

The measurement processing part 221 similarly executes the marker detection process from step S10 to step S140 on the remaining picked-up images 60b to 60f resulting from picking up the correcting images 111b to 111f. By doing so, the deviation of the correcting images 111a to 111f within the individual picked-up images 60a to 60f is offset corrected by matching the positions of the markers 41.

After the image pickup device 20 detects the positions of the markers 41 of the individual picked-up images 60a to 60f, the image pickup device 20 detects coordinates of points of intersection (corner portions) of the checkered patterns based on the picked-up images 60d to 60f and then can obtain degrees of distortion of the correcting images 111a to 111*f* projected by the projector 10. Additionally, the image pickup device 20 can obtain a change in color for each position of the projection plane 31 based on the picked-up images 60*a* to 60*c* in combination with the picked-up images 60*d* to 60*f*. The measurement processing part 221 transmits these pieces of information to the projector 10 by way of the communication module 25 as image correcting information 25*a*. Then, the projector 10 can correct the viewing image data based on the image correcting information 25*a* using the image correction processing part 121 and project the corrected image data so that the viewer can view an intended image.

A configuration may be adopted in which the marker candidates extracted through steps S10 to S140 are processed further to be narrowed down to a smaller number by a separate determination device for determination of image position identifying markers 41. For example, it can be determined whether the combination of the contour C0 and the contour C1 (for example, the contour 711 and the contour 715) extracted as the marker candidate in step S140 is finally used for image adjustment among the correcting images 111*a* to 111*f*. As determination methods, (1) a determination based on a length of a line or (2) a determination based on an inclination of a line, which will be described as below, can be used.

(1) Determination Based on a Length of a Line

In a determination based on a length of a line, firstly, the measurement processing part 221 calculates lengths of the lines 711*a* to 711*d* of the contour 711 and lengths of lines 715*a* to 715*c*. The measurement processing part 221 can determine the contour 711 and the contour 715 as constituting a marker when the lengths of the lines 711*a* to 711*d* and the lengths of the lines 715*a* to 715*c* fall within ranges of predetermined thresholds. The threshold range applied to the lines 711*a* to 711*d* and the threshold range applied to the lines 715*a* to 715*c* can be set to different ranges from each other. The threshold range applied to the lines 711*a* to 711*d* and the threshold range applied to the lines 715*a* to 715*c* may differ depending on the individual lines 711*a* to 711*d* and individual lines 715*a* to 715*c* in the contour 711 and the contour 715. In the determination based on the lengths of the lines, the threshold ranges may be determined based on the relative lengths of the lines 711*a* to 711*d* and 715*a* to 715*c*.

(2) Determination Based on an Inclination of a Line

In a determination based on an inclination of a line, the measurement processing part 221 can determine the contour 711 and the contour 715 as constituting a marker 41 when inclinations of the lines 711*a* to 711*d* and inclinations of the lines 715*a* to 715*c* fall within predetermined threshold ranges. The threshold range applied to the lines 711*a* to 711*d* and the threshold range applied to the lines 715*a* to 715*c* may differ from each other. The threshold range can be determined based on a relative inclination of one line to a particular other line. For example, when one of the lines of the first polygon 43 is not parallel to at least each of the lines of the second polygon 44, the measurement processing part 221 can determine the contour 711 and the contour 715 as constituting a marker. In the example of FIG. 7C, although the lines 711*a*, 711*b* of the contour 711 of the first polygon 43 are substantially parallel to the line 715*c* of the contour 715 of the second polygon 44, the lines 711*c*, 711*d* of the contour 711 of the first polygon 43 are not in a parallel relationship with the lines 715*a* to 715*c* of the contour 715 of the second polygon 44, and due to this, the measurement processing part 221 can determine that the combination of the contour 711 and the contour 715 constitutes a marker.

The contours may be determined whether they are used as an image position adjusting marker based on a combination of the determination based on the lengths of the lines and the determination based on the inclinations of the lines.

Thus, as has been described heretofore, in the case where a different number of marker candidates from the number of markers provided on the correcting image 111 are extracted or where the markers 41 on the picked-up image are detected with their positions or shapes left unclear, by extracting the markers, the marker candidates can be removed. In this way, the position correcting accuracy among the correcting images 111 can be improved by enhancing the detection accuracy of the markers 41.

As a different configuration, the number of vertexes of the second polygon 44 may be equal to or smaller than the number of vertexes of the first polygon 43, and the first polygon is the quadrangle, while the second polygon 44 may be a quadrangle which is similar to and smaller than the first polygon while being inclined or rotated by a predetermined angle (for example, rotated 45 degrees). Additionally, the shapes of the first polygon 43 and the second polygon 44 are not limited to the regular polygons illustrated in FIG. 4 and hence can be scalene polygons.

A plurality of second polygons 44 may be disposed inside the first polygon 43. For example, the first polygon 43 remains the quadrangle, while a plurality of triangles constituting second polygons 44 may be disposed inside the quadrangle. Alternatively, the marker 41 may be formed into a double or more nested configuration in which a polygon is further included inside the second polygon inside the first polygon.

As the condition under which the extracted first polygons 43 and second polygons 44 are narrowed down as candidates for markers 41, the determination based on the ratio of the area S0 to the area S1, the determination based on the lengths of the lines, and the determination based on the inclinations of the lines can be executed singly or in combination.

In the embodiment, the image pickup device 20 is described as including the marker detection program 242 and executing the marker detection process illustrated in FIG. 6, but the invention is not limited thereto. The marker detection program 242 is stored in the projector 10, and hence, the projector 10 may execute the marker detection process illustrated in FIG. 6 by transmitting the picked-up images 60 picked up by the image pickup device 20 to the projector 10.

In the embodiment, the first polygon 43 is described as being formed into the black frame configuration having the white interior, and the second polygon 44 is described as being formed black, but the invention is not limited thereto. The first polygon 43 may be formed into a white frame configuration having a black interior, and the second polygon 44 may be formed white.

Thus, as has been described heretofore, the projection control device of the embodiment of the invention includes the projection module 13 configured to project the correcting images 111 in which the image position identifying markers 41 each including the first polygon 43 and the second polygon 44 disposed inside the first polygon 43 are disposed in the predetermined positions in such a way as to be picked up by the image pickup device 20. Then, at least one of the sides of the first polygon 43 is non-parallel to the sides of the second polygon 44.

Due to this, the image position identifying markers 41 can be distinguished relatively easily from patterns or the like which are formed repeatedly on the projection plane 31, thereby making it possible to reduce erroneous detections of the markers to thereby improve the detection accuracy. Thus, the alignment of the plurality of correcting images 111 can be facilitated.

With the projection control device in which the number of vertexes of the second polygon 44 is the number of vertexes of the first polygon 43 or smaller, the configuration of the marker is simplified, whereby the determination of the second polygon 44 becomes as easy as or easier than the determination of the first polygon 43, thereby making it possible to reduce the load in detecting the markers.

With the projection control device in which the first polygon 43 is the quadrangle and the second polygon 44 is the triangle, the combination of the shapes constituting the marker 41 becomes simple, and therefore, the shape detection process becomes simple, thereby making it possible to increase the degree of freedom in mounting environment of programs such as using a device with a low processing capacity.

With the projection control device in which the first polygon 43 is formed into the frame configuration, and the second polygon 44 is formed to be colored out in the same color as that of the first polygon 43, in the marker determination process, a further contour is prevented from being extracted inside the second polygon 44, whereby the necessity of executing further a lower hierarchy contour determination after the contour of the second polygon 44 is determined is obviated, thereby making it possible to reduce the load in the contour extraction process.

With the projection control device in which another side of the first polygon 43 which differs from the one of the sides thereof is parallel to any one of the sides of the second polygon 44, the commonality between the first polygon 43 and the second polygon 44 is reduced, thereby making it possible to reduce further erroneous detections of the markers 41.

Causing the marker 41 to be detected includes extracting the contour of the correcting image 111, extracting, when the contour of the first process target selected from the extracted contour has vertexes corresponding in number to the predetermined first condition, the contour residing further inwards than the contour of the first process target, obtaining, when the contour of the second process target selected from the inward contour has vertexes corresponding in number to the predetermined second condition, the ratio of the area of the contour of the first process target to the area of the contour of the second process target, and obtaining, when the ratio falls within the predetermined range, the contours of the first process target and the second process target as the marker. By adopting this configuration, since the marker can be distinguished relatively easily from the patterns on the projection plane 31, errors in the marker detection process or the load in retrying the marker detection process.

The embodiment that has been described heretofore is presented as an example, and hence, there is no intention to limit the scope of the invention by the embodiment. The novel embodiment can be carried out in other various forms, and various omissions, replacements and modifications can be made to the embodiment without departing from the spirit and scope of the invention. Those resulting embodiments and their modifications are included in the spirit and scope of the invention and are also included in the scope of inventions claimed for patent under claims below and their equivalents.

What is claimed is:

1. A projection control device comprising:
   a projection module configured to project a correcting image onto a projection target, the correcting image including an image position identifying marker which includes a first polygon and a second polygon positioned inside the first polygon and which is arranged in a predetermined position, and the correcting image being projected onto the projection target for pickup by an image pickup device,
   wherein at least one of sides of the first polygon is non-parallel to sides of the second polygon, and
   wherein the second polygon has as many vertices as the first polygon or has fewer vertices than the first polygon.

2. The projection control device according to claim 1, wherein the first polygon has a quadrangular shape, and wherein the second polygon has a triangular shape.

3. The projection control device according to claim 2, wherein the first polygon is formed into a frame shape, and
   wherein the second polygon is formed by being colored out in a color identical to a color of the first polygon.

4. The projection control device according to claim 3, wherein another side of the first polygon which is different from the at least one side thereof is parallel to one of the sides of the second polygon.

5. The projection control device according to claim 2, wherein another side of the first polygon which is different from the at least one side thereof is parallel to one of the sides of the second polygon.

6. The projection control device according to claim 1, wherein the first polygon is formed into a frame shape, and
   wherein the second polygon is formed by being colored out in a color identical to a color of the first polygon.

7. The projection control device according to claim 6, wherein another side of the first polygon which is different from the at least one side thereof is parallel to one of the sides of the second polygon.

8. The projection control device according to claim 1, wherein another side of the first polygon which is different from the at least one side thereof is parallel to one of the sides of the second polygon.

9. The projection control device according to claim 1, further comprising:
   a communication device that communicates with the image pickup device,
   wherein the projection control device acquires, from the image pickup device via the communication device, a result of analyzing the correcting image.

10. A marker detection method comprising:
    projecting a correcting image onto a projection target using a projection control device, the correcting image including an image position identifying marker which includes a first polygon and a second polygon positioned inside the first polygon and which is arranged in a predetermined position;
    picking up a plurality of the correcting images projected onto the projection target using an image pickup device; and
    causing the marker to be detected,
    wherein at least one of sides of the first polygon is non-parallel to sides of the second polygon, and
    wherein the second polygon has as many vertices as the first polygon or has fewer vertices than the first polygon.

11. The marker detection method according to claim 10, wherein the causing the marker to be detected comprises:
- extracting a contour of the correcting image picked up by the image pickup device;
- extracting, when a contour of a first process target selected from the extracted contour has vertices corresponding in number to a predetermined first condition, a contour residing further inwards than the contour of the first process target;
- obtaining, when a contour of a second process target selected from the inward contour has vertices corresponding in number to a predetermined second condition, a ratio of an area of the contour of the first process target to an area of the contour of the second process target; and
- obtaining, when the ratio falls within a predetermined range, the contours of the first process target and the second process target as the marker.

12. A non-transitory storage medium readable by a computer, the storage medium storing a program which is executable to control the computer to execute processes comprising:
- performing control to project a correcting image onto a projection target, the correcting image including an image position identifying marker which includes a first polygon and a second polygon positioned inside the first polygon and which is arranged in a predetermined position;
- performing control to pick up a plurality of the correcting images projected onto the projection target; and
- performing control to cause the marker to be detected,
- wherein at least one of sides of the first polygon is non-parallel to sides of the second polygon, and wherein the second polygon has as many vertices as the first polygon or has fewer vertices than the first polygon.

13. A marker detection method comprising:
- projecting a correcting image having an image position identifying marker including a first polygon and a second polygon positioned inside the first polygon and arranged in a predetermined position using a projection control device, at least one of sides of the first polygon being non-parallel to sides of the second polygon;
- picking up a plurality of the correcting images using an image pickup device; and
- causing the marker to be detected,
- wherein the causing the marker to be detected comprises:
  - extracting a contour of the correcting image picked up by the image pickup device;
  - extracting, when a contour of a first process target selected from the extracted contour has vertices corresponding in number to a predetermined first condition, a contour residing further inwards than the contour of the first process target;
  - obtaining, when a contour of a second process target selected from the inward contour has vertices corresponding in number to a predetermined second condition, a ratio of an area of the contour of the first process target to an area of the contour of the second process target; and
  - obtaining, when the ratio falls within a predetermined range, the contours of the first process target and the second process target as the marker.

* * * * *